J. SEARS.
COMBINED CAN AND MEASURE.

No. 194,112. Patented Aug. 14, 1877.

Witnesses.
Jac. Scheitlin
Denny Halsted

Inventor.
Joseph Sears
per John J. Halsted,
Atty.

N. PETERS, PHOTO-LITHOGRAPHER, WASHINGTON, D. C.

UNITED STATES PATENT OFFICE.

JOSEPH SEARS, OF CHICAGO, ILLINOIS.

IMPROVEMENT IN COMBINED CAN AND MEASURE.

Specification forming part of Letters Patent No. 194,112, dated August 14, 1877; application filed July 16, 1877.

*To all whom it may concern:*

Be it known that I, JOSEPH SEARS, of Chicago, in the county of Cook and State of Illinois, have invented certain new and useful Combined Lard-Packing Can, Measure, and Cake or Biscuit Cutter; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention consists in making a lard-can not only such that it shall, when its contents have been used, serve as a predetermined measure for liquids or solids, but also in a special construction of the mouth of the vessel and of the cover, whereby they are adapted for making a tight wedging joint between themselves, and on two flat surfaces inclined to each other.

Figure 1:
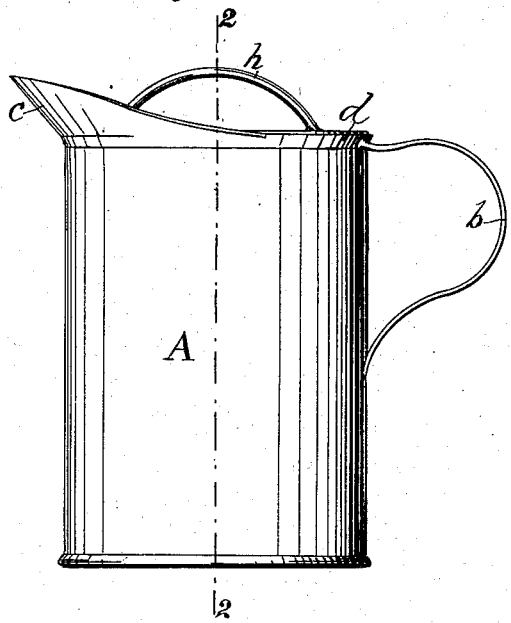
Figure 2:
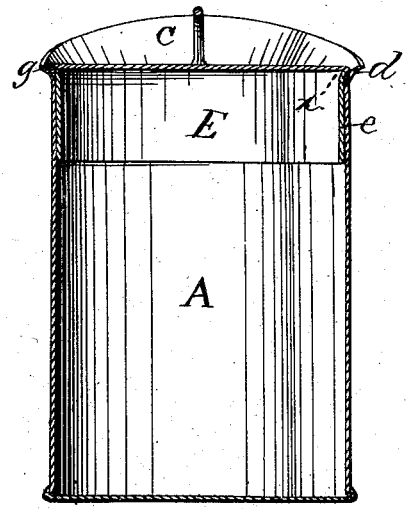
Figure 3:
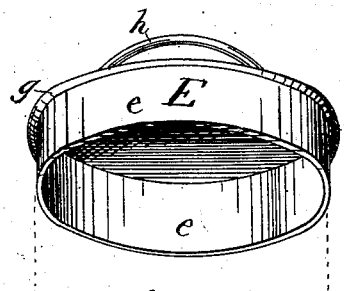
Figure 4:
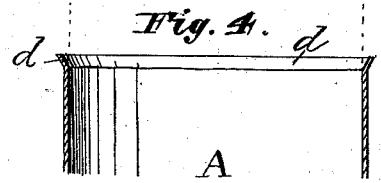

Figure 1 is an elevation; Fig. 2, a vertical section in line 2 2 of Fig. 1; Fig. 3, a perspective of the cover; and Fig. 4, a top part of a can, illustrating my invention.

A is the vessel, made to hold any quantity desired, say, one-half pint, pint, quart, half-gallon, &c. It may be varied in shape. It is provided with a handle, v, and also with a flaring mouth or spout, c, at its top, to facilitate the pouring out of liquids, &c., and it has a slight outward flare, d, at its top edge, which serves two purposes—viz., first, to permit the cover E to be readily inserted within the vessel, and also to allow a firmer hold of the spout c, which is soldered at the edges of the vessel. The cover is made with a downwardly-projecting rim, e, of diameter such as to be fitted snugly within the mouth of the vessel, and to retain its place by frictional contact, and with a top piece of slightly greater diameter and with a beveled edge, g, adapted for the flare d, these parts d and g limiting or preventing the descent of the cover below the proper point, and also making a closer fit to exclude air, dust, &c.; and it is provided with a handle, h, by which it may be easily inserted in or removed from the vessel.

The flaring part d of the can makes an obtuse angle with its sides, and the inclined or beveled edge g of the cover makes a similar obtuse angle with the rim e of the cover; consequently, when the cover is pushed down tightly to its place, these parts g and d admit of forcing or wedging the cover down as tightly as possible to place, making the closest practicable air-tight fit. The joint thus made, when the cover is on, is a double joint—viz., a portion being that of a cylinder within a cylinder, and a portion that of a frustum of a cone within a frustum of a cone.

The lower line of the rim-cover e is all in the same plane, and forms a cutting-edge for cutting out biscuits, cakes, &c., from dough, for domestic use, the handle performing its use in such case, as well as for putting on and removing the cover.

From this construction it will be seen that while the cup or can answers all the ordinary purposes of lard-cans of other well known constructions, it has also the additional feature of not only determining by its predetermined measurement or capacity the actual quantity of its contents of lard, but is, when emptied, a perfect measure (of pint, quart, &c., as the case may be) for either liquids or for flour, &c., with a mouth for pouring out the same, and a cover always ready, and which in domestic uses is a most convenient and useful implement in the baking department.

The cost is about the same as of ordinary lard-cans, as the handle, the spout, and the handle on the cover may be made of small or waste bits or scraps, while the several useful purposes to which the parts are applicable after the lard has been used are manifest; and when used for liquids, it will be seen that the same will not splash up and run over the top of the can and drop down its sides, as if the flange of the cover were on the outside of the can; on the contrary, any shaking up of liquid in the covered vessel can only splash such liquid up into the cover itself, where it will be arrested by the angle x of such cover, and thence it must fall back again inside of both the cover and the can.

I claim—

The lard-packing can described, made not only as a true measure of its contents, and having a handle and a pouring-mouth and cover E, but having the outward incline $d$ at the top of the can, and the corresponding incline $g$ on the cover, such inclines being in the form of frusta of cones, and adapted for making a tight wedging joint, all as shown and described.

In testimony that I claim the foregoing as my own I affix my signature in presence of two witnesses.

JOSEPH SEARS.

Witnesses:
   J. O'CONNOR,
   W. H. BURNET.